United States Patent [19]
Evstatiev et al.

[11] Patent Number: 4,842,789
[45] Date of Patent: Jun. 27, 1989

[54] PREPARATION OF HIGH-MODULUS, HIGH-STRENGTH LINEAR POLYCONDENSATES

[75] Inventors: Michail G. Evstatiev; Stoyko C. Fakirov, both of Sofia, Bulgaria; Jerold M. Schultz, Newark, Del.

[73] Assignee: University of Delaware, Newark, Del.

[21] Appl. No.: 210,263

[22] Filed: Jun. 23, 1988

[51] Int. Cl.$^4$ .............................................. B29C 55/00
[52] U.S. Cl. ..................................... 264/101; 264/85; 264/235.6; 264/235.8; 264/291
[58] Field of Search ...................... 264/85, 101, 235.6, 264/235.8, 288.4, 290.5, 291, 346

[56] References Cited

U.S. PATENT DOCUMENTS 4,042,569  8/1977  Bell et al. ......................... 264/235.8
4,082,731  4/1978  Knopka ............................. 264/235.6

OTHER PUBLICATIONS

Capaccio et al., "The Role of Crystallinity & Morphology in the Preparation of Ultra-Highly Oriented Polyethylene," ASC Poly. Prep. 8, No. 2 (1977), pp. 343-345.

Mead et al., "The Influence of Initial Morphology on the Physical & Mechanical Properties of Extruded High Density Polyethylene Fibers," Flow Induced Crystallization in Polymer Systems, R. L. Miller, Ed., Cordon & Breach Science Publishers, N.Y., London, Paris (1979), pp. 139-167.

Cifferi et al., "Solution Spinning of Rigid & Semi-Rigid Polymers," Ultra-High Modulus Polymers, Applied Science Publishers, London (1979), Frontispiece pp. 203-211.

M. P. W. Wilson, "Shrinkage & Chain Folding in Drawn Poly (ethylene terephthalate) Fibres," Polymer 15 (1974), pp. 277-282.

Primary Examiner—James Lowe
Attorney, Agent, or Firm—James H. Ryan

[57] ABSTRACT

Described and claimed is a process for obtaining high-modulus, high-strength linear polycondensates, e.g., polyamides, comprising the sequential steps drawing at room temperature, isothermal annealing at 180°–270° C., a second drawing at room temperature, and a second isothermal annealing at 120°–260° C., an orientation degree after the second drawing being 20–25.

5 Claims, No Drawings

PREPARATION OF HIGH-MODULUS, HIGH-STRENGTH LINEAR POLYCONDENSATES

RIGHTS OF THE U.S. GOVERNMENT

The government of the United States of America has certain rights to this invention pursuant to National Science Foundation Grant No. INT 8520639.

PRIORITY

Priority is claimed of Bulgarian Authorship Certificate (Patent) application filed under Ser. No. 81,314 for "Method for the Preparation of High-Modulus and High-Strength Linear Polycondensates" on Sept. 29, 1987, in Sophia, Bulgaria.

BACKGROUND OF THE INVENTION

1. Field of the Invention

The invention relates to a method for the preparation of high modulus and high strength linear polycondensates for known commercial utility.

2. Prior Art

It is known that polymer materials subjected to external drawing pass into an oriented state characterized by improved physico-mechanical properties. Several methods for the preparation of highly oriented polymer materials are known, including:
1. Mechanical drawing below the melting temperature of the polymer (Cappacio, G., T. A. Crompton, I. M Ward, ASC Polym. Prepr., 18 (1977) 343).
2. Extrusion from the melt (most often used in the production of industrial fibers) or solid state extrusion (Mead, W. T., R. S. Porter, Flow Induced Crystallization Symposium, Midland Macromolecular Institute, Michigan, August (1977)).
3. Formations from solutions (which is the case with the polymer material KEVLAR®) (Ciferri and Ward, Ultra-High Modulus Polymers, Applied Science Publishers, London (1979) 203, 205–211).
4. Two-stage orientation at high temperatures (Wilson, M. P. Polymer 15 (1974) 277).

The disadvantages of the known methods consist in that it is not possible to obtain at room temperature a draw ratio higher than 5–6:1 for polyamide 6 (PA-6), poly(ethyleneterephthalate) (PET) and poly(-butyleneterephthalate) (PBT) and the higher orientation of these polymers at temperatures close to their melting points does not lead to a substantial increase in their strength. For this reason, the above cited methods are inapplicable to PA-6, PET and PBT since their chemical structure is different from and more complicated than that of the polyolefins, e.g., polyethylene, polypropylene, etc., used in the literature sources cited above.

DESCRIPTION OF THE INVENTION

The object of this invention is to provide a method for the preparation of high-modulus and high-strength linear polycondensates.

The physico-mechanical properties of a highly oriented, partially crystalline polymer are determined by the relative content and the number of the tie molecules bearing the stress. For this reason the orientation (drawing) of this invention should be conducted under conditions allowing the crystallization of a maximal quantity of macrochains in a stretched conformation, rather than in a folded one. This is now achieved by a process in which drawn films or cables of PA-6, PBT and PET are obtained through orientation at room temperature (15°–20° C.). The samples thus obtained, having a draw ratio $\lambda = 5$–5.5, are subjected to isothermal annealing at 180°–270° C. in vacuum or in an inert gas flow for 60 to 360 min. with fixed ends. Then a second drawing at room temperature is carried out to $\lambda = 15$–25, followed by annealing with fixed ends at 120°–260° C.

The advantages of the method according to the invention consist in that the materials obtained show a strength that is three times higher than that of the fibers and foils of PA-6, PET and PBT, oriented according to known industrial methods. The method according to the invention allows the achievement of a final draw ratio $\lambda = 15$–25 which cannot be obtained with these polymers (linear polycondensates) by a two-stage orientation at elevated temperatures (150°–200° C.).

EXAMPLE 1

A commercial foil or cable of PET with a diameter of 1 mm is subjected to drawing at room temperature up to 80 =5. The oriented material is subjected to isothermal annealing with fixed ends either in vacuum or in an inert medium (nitrogen flow) for 360 min. at 260° C. After cooling, the samples thus obtained are subjected to a second drawing at room temperature at $\lambda = 20$ and to a second annealing with fixed ends at 145° C. for 120 minutes.

EXAMPLE 2

The procedure described in Example 1 is followed, except that the starting material is PA-6 and the temperature of the first and second isothermal annealings are 215° C. and 125° C., respectively.

EXAMPLE 3

The procedure described in Example 1 is followed, except that the starting material is PBT and the temperatures of the first and second isothermal annealing are 210° C. and 130° C., respectively.

The results of the physico-mechanical tests of the materials thus obtained are presented in the following comparative table.

TABLE

| | MATERIAL | $\lambda_1$ | $\lambda_2$ | $\lambda_{1+2}$ | $\sigma_n$ (MPa) | $\sigma_b$ (MPa) | $\epsilon$ (%) | E (MPa) |
|---|---|---|---|---|---|---|---|---|
| 1. | PET | 5 | —5 | 5 | 165 | 240 | 70 | 2800 |
| 2. | PET (according to the invention) | 5 | 4 | 20 | 440 | 480 | 12 | 8400 |
| 3. | PA-6 | 5 | — | 5 | 120 | 180 | 46 | 2200 |
| 4. | PA-6 (according to the invention) | 5 | 5 | 25 | 350 | 380 | 18 | 7600 |
| 5. | PBT | 5 | — | 5 | 170 | 225 | 45 | 2500 |
| 6. | PBT (according to | 5 | 4 | 20 | 420 | 460 | 12 | 7700 |

| MATERIAL | $\lambda_1$ | $\lambda_2$ | $\lambda_{1+2}$ | $\sigma_n$ (MPa) | $\sigma_b$ (MPa) | $\epsilon$ (%) | E (MPa) |
|---|---|---|---|---|---|---|---|
| the invention) | | | | | | | |

$\lambda_1$ - draw ratio (orientation degree) achieved at the first drawing at room temperature
$\lambda_2$ - draw ratio (orientation degree) achieved at the second drawing at room temperature
$\lambda_n$ - Stress at neck-formation
$\lambda_b$ - stress at break
$\epsilon$ - deformation at break
E - elasticity modulus Having described our invention we claim:

1. The process for the preparation of high-modulus and high-strength linear polycondensates by increasing their orientation degree through drawing at room temperature characterized in that drawing is followed by isothermal annealing with fixed ends in vacuum or in an inert gas flow at a temperature of 180°–270° C. for 60 to 360 minutes, a second drawing at room temperature; and by a second isothermal annealing with fixed ends in vacuum or in an inert gas flow at a temperature of 120°–260° C. for 60 to 120 minutes, the overall orientation degree achieved after the second drawing being 20–25.

2. The process of claim 1 in which the polycondensate is that of a polyamide.

3. The process of claim 1 in which the polycondensate is that of a polyamide-6.

4. The process of claim 1 in which the polycondensate is that of a poly(ethyleneterephthalate).

5. The process of claim 1 in which the polycondensate is that of a poly(butyleneterephthalate).

* * * * *